(12) United States Patent
Galban

(10) Patent No.: US 7,283,260 B2
(45) Date of Patent: Oct. 16, 2007

(54) APPARATUS AND METHOD FOR RESTORING CURRENT PARAMETERS AND/OR VALUES

(75) Inventor: Julian J. Galban, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 784 days.

(21) Appl. No.: 10/248,392

(22) Filed: Jan. 15, 2003

(65) Prior Publication Data

US 2004/0136024 A1    Jul. 15, 2004

(51) Int. Cl.
*G06F 15/00* (2006.01)
(52) U.S. Cl. .................. 358/1.14; 358/1.16; 711/162; 714/2; 714/3; 714/15; 714/19
(58) Field of Classification Search ............... 358/1.14, 358/1.16; 707/202, 204; 714/1–2, 5–6, 714/15, 19, 25, 42, 46, 710, 746–747, 764; 711/161–162; 709/221–222
See application file for complete search history.

(56) References Cited

U.S. PATENT DOCUMENTS

| | | | |
|---|---|---|---|
| 6,101,576 A * | 8/2000 | Kobayashi et al. | 711/122 |
| 6,477,629 B1 * | 11/2002 | Goshey et al. | 711/162 |
| 6,912,642 B2 * | 6/2005 | Nishikawa | 711/171 |
| 7,062,541 B1 * | 6/2006 | Cannon et al. | 709/219 |

* cited by examiner

*Primary Examiner*—Kimberly A. Williams
(74) *Attorney, Agent, or Firm*—Oliff & Berridge, PLC

(57) ABSTRACT

Techniques for restoring parameters and/or values include determining a set of one or more parameters and/or values to be accessed by a user and that are stored in a first memory location, retrieving a duplicate of the set of one or more parameters and/or values to be accessed and storing that duplicate set in another memory location. In the event that one or more of the set of one or more parameters and/or values accessed by a user need to be placed back to their previous state, the duplicate set of one or more parameters and/or values is retrieved to replace one or more of the set of parameters and/or values accessed by the user.

13 Claims, 4 Drawing Sheets

APPARATUS AND METHOD FOR RESTORING CURRENT PARAMETERS AND/OR VALUES

BACKGROUND OF THE INVENTION

1. Field of Invention

This invention relates to systems, apparati and methods for restoring current parameters and/or values.

2. Description of Related Art

A data processing system, such as an image processing system, generally has one or more logic units and one or more controllers that operate cooperatively to perform the functions of the system. For example, in a copier system, a logic unit may control the overall system. One or more controllers may control the operation of the scanner unit. Likewise, one or more controllers may control the operation of the printer unit. Likewise, one or more controllers may control the operations of the paper trays, one or more controllers may control the display unit and so forth. The logic unit and the various controllers are usually programmable and may require various operating parameters and/or values that dictate and/or optimize the operation of the logic unit and/or one or more of the controllers. For example, the printer controller may require operation parameters and/or values to control printer head alignment, the unit amount of ink or toner to be deposited, print head movement, and so forth. These operating parameters and/or values may be stored in memory from which they may be utilized in the performance of the operation of the logic unit and/or the various controllers.

SUMMARY OF THE INVENTION

During manufacture or service of a system, personnel may perform various diagnostic tests to determine the performance of the system, to identify defects in the system, or to adjust the control parameters and/or values that optimize the system's operation. In one example, personnel may perform the diagnostic test at the controller level, which requires using one or more different operation parameters and/or values that allow the system to be thoroughly tested. In another example, personnel manipulate the various operation parameters and/or values to optimize the system performance. However, when changing the operation parameters and/or values, if any errors are made, it may be difficult to determine which parameters and/or values have been erroneously changed. In many cases, it is difficult to determine the error due to the large number of the parameters and/or values. In many instances, all the operation parameters and/or values would need to be checked and/or re-entered manually because it is not known, nor is it easy to determine, which parameters and/or values caused the system error. In many instances, it may be necessary to resort to the product service manual to determine the affected parameters to identify or even the correct parameters and/or values to be reentered. If the affected operation parameters and/or the values are not corrected, this may result in the system's performance not being optimized, or may cause the system to malfunction.

This invention provides apparati, systems and methods that enable personnel to revert stored system parameters and/or values to a known state in the event of erroneous alterations.

This invention provides apparati, systems and methods that enable personnel to revert stored system parameters and/or values to a known state without resorting to a product service manual.

This invention provides apparati, systems and methods that allow service time to be decreased.

In various exemplary embodiments, the apparati, systems and methods according to this invention restore a set of system parameters and/or values to current parameters and/or values. In various exemplary embodiments, a set of one or more first memory locations for a set of one or more parameters and/or values to be accessed is determined. In various exemplary embodiments, a duplicate of the set of one or more parameters and/or values to be accessed is retrieved. In various exemplary embodiments, a duplicate of the retrieved set of one or more parameters and/or values is stored in a second set of one or more memory locations.

In various exemplary embodiments, the stored set of one or more parameters and/or values in the second memory location is retrieved. In various exemplary embodiments, the set of one or more parameters and/or values in the first set of one or more memory locations is replaced with the retrieved set of parameters and/or values of the second set of one or more memory locations.

In various exemplary embodiments, storing the duplicate of the set of parameters and/or values includes allocating memory space to store the duplicate set of parameters and/or values. In various exemplary embodiments, the one or more memory addresses of the second set of one or more memory locations containing the duplicate set of parameters and/or values is retained.

In various exemplary embodiments, the second set of one or more memory locations containing the duplicate set of parameters and/or values is relinquished if a reset or deallocation signal is received. In various exemplary embodiments, the second set of one or more memory locations containing the duplicate set of parameters and/or values is relinquished if a predetermined amount of time has passed since the duplicate set of parameters and/or values was stored in the second set of one or more memory locations.

These and other features and advantages of the invention are described in or are apparent from the following detailed description of various exemplary embodiments of the systems, apparati and methods according to this invention.

BRIEF DESCRIPTION OF THE DRAWINGS

Various exemplary embodiments of the invention are described in detail with reference to the following figures wherein.

DETAILED DESCRIPTION OF EXEMPLARY EMBODIMENTS

Figure 1:
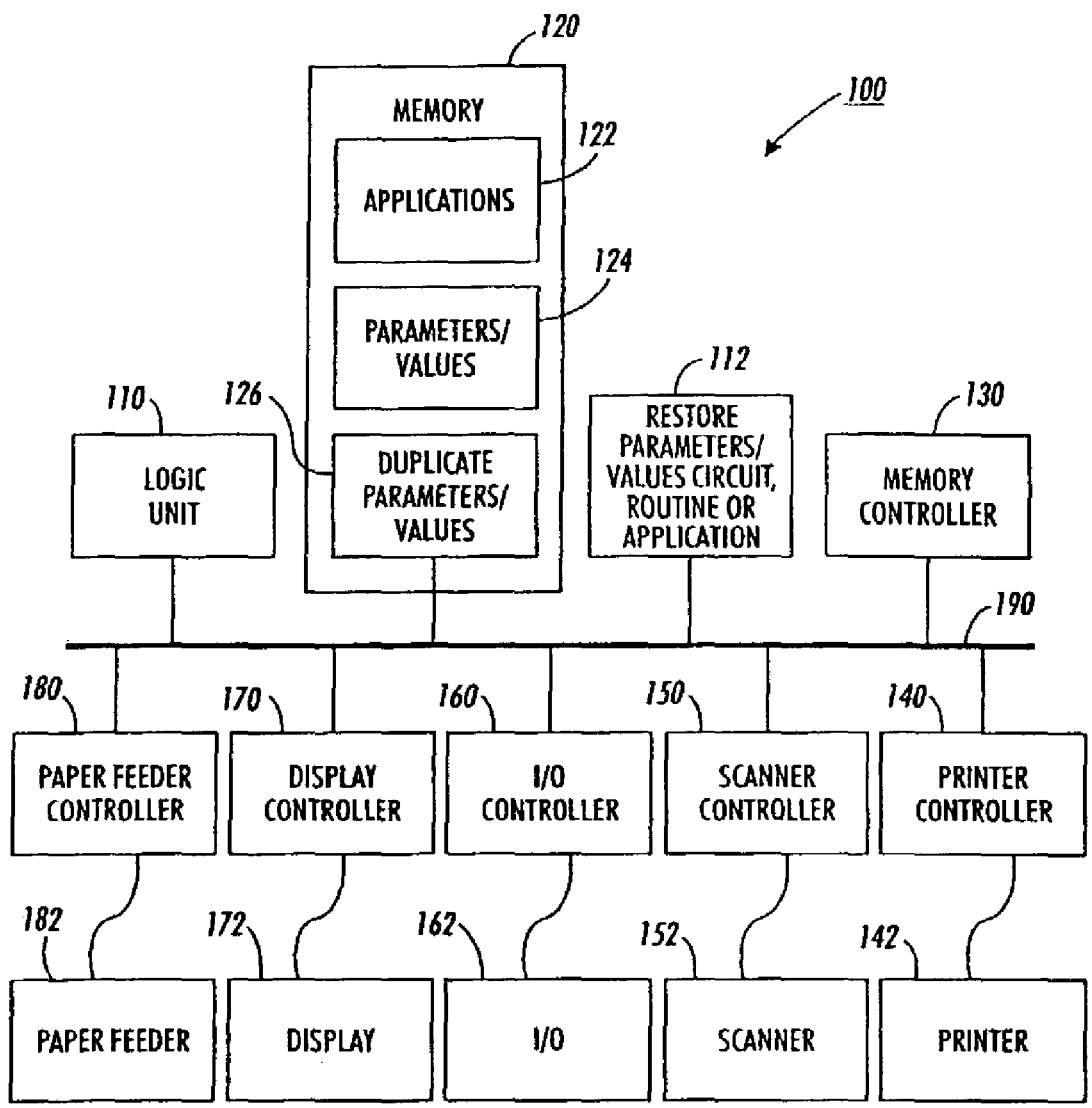
FIG. 1 shows a functional block diagram of a first exemplary embodiment of a data processing system that is capable of restoring a set of one or more current parameters and/or values according to this invention.

FIG. 1 shows a functional block diagram of a first exemplary embodiment of a data processing system 100 that is able to restore a set of current parameters and/or values according to this invention. It should be appreciated that the data processing system 100 shown in FIG. 1 is an image output system. However, it should be appreciated that this is illustrative only, and any other suitable data processing system could be used in place of the illustrated image output system to implement the data processing system 100.

As shown in FIG. 1, the data processing system 100 includes a logic unit 110, a memory 120 and one or more controllers 130, 140, 150, 160, 170 and 180, interconnected by one or more control and/or data busses and/or application programming interfaces 190. The number and type of controllers 130, 140, 150, 160, 170 and 180 may vary or change dependent on the device and/or apparatus used to implement the data processing system 100. In general, the data processing system 100 represents any known or later-developed data processing system, such as a computer, a copier, a printer, a scanner, a facsimile machine, a telecommunication system, a display system and so forth.

Each of the controllers 130, 140, 150, 160, 170 and 180 controls at least one corresponding unit 120, 142, 152, 162, 172 and 182, respectively, of the data processing system 100. For example, in the specific embodiment shown in FIG. 1, a memory controller 130 controls a memory 120. A printer controller 140 controls a printer 142, while a scanner controller 150 controls a scanner 152. An input/output (I/O) controller 160 controls an I/O interface 162. A display controller 170 controls a display device 172, while a paper feeder controller 180 controls a paper feeder 182 and so forth. During operation of the data processing system 100, various applications 122 stored in the memory 120 are executed by the logic unit 110 to control the data processing system 100 and various ones of the controllers 130, 140, 150, 160, 170 and 180 to perform the specific tasks required to operate the corresponding devices 120, 142, 152, 162, 172 and 182.

The applications 122 may rely on various parameters and/or values 124 stored in the memory 120 during operation of the logic unit 110 and/or the controllers 130, 140, 150, 160, 170 and 180. As an example, the parameters and/or values 124 may provide one or more of the controllers 130, 140, 150, 160, 170 or 180 with a mode of operation with respect to the corresponding device 120, 142, 152, 162, 172 or 182. In another example, the parameters and/or values 124 may provide one or more of the controllers 130, 140, 150, 160, 170 or 180 with operational parameters that optimizes the functional features of the device 120, 142, 152, 162, 172 and 182. The parameters and/or values 124 may be defined and stored into the memory 120 of the data processing system 100 at the factory or may be stored into the memory 120 by personnel during installation set-up and/or servicing of the data processing system 100.

In many instances, after the parameters and/or values 124 have been defined and stored into the memory 120, one or more of these parameters and/or values 124 may need to be modified for various reasons. For example, adding new hardware or features to the data processing system 100 may require various ones of the parameters and/or values 124 to be modified to accommodate the new hardware or features. In another example, diagnostic tests are performed on the data processing system 100 to determine whether one or more of the corresponding units 120, 142, 152, 162, 172 and/or 182 in the data processing system 100 are malfunctioning and/or requires servicing and/or optimization. In these instances, various ones of the parameters and/or values 124 may be modified to be better suited for the diagnostics or optimization.

In various exemplary embodiments, a restore parameters and/or values circuit, routine or application 112 duplicates and stores a set of one or more of the currently stored parameters and/or values 124, that is, a duplicate set of one or more of the parameters and/or values 126, a set of one or more memory locations that is different from the one or more memory locations that store the currently-stored parameters and/or values 124 in the memory 120. In various exemplary embodiments, the restore parameters and/or values circuit, routine or application 12 is implemented using an ASIC, a digital signal processor (DSP), a micro-processor or micro-controller, a hardware electronic or logic circuit, such as a discrete element circuit, a programmable logic device, such as a PLD, PLA, FPGA or PAL, a routine, subroutine or independent application executable by the logic unit 110 and stored in the memory 120 or some other memory device, or the like. In various exemplary embodiments, the restore parameters and/or values circuit, routine or application 112 is a routine, subroutine or independent application that when invoked or activated by the logic unit 110, performs various operations described herein.

The memory 120 may be implemented using non-volatile memory and/or volatile memory or a combination of the two. In various exemplary embodiments, the current parameters and/or values 124 may be stored in non-volatile memory and the duplicate parameters and/or values 126, may be stored in volatile memory. In contrast, in various other exemplary embodiments, the current parameters and/or values 124 may be stored in volatile memory and the duplicate parameters and/or values 126 may be stored in non-volatile memory. In yet other various exemplary embodiments, both the current parameters and/or values 124 and the duplicate parameters and/or values 126 may be stored in non-volatile memory, or both may be stored in volatile memory.

In various exemplary embodiments, the stored one or more current parameters and/or values 124 are duplicated prior to the one or more current parameters and/or values 124 being accessed by a user. In various exemplary embodiments, prior to accessing the one or more current parameters and/or values 124, the user, for example, activates the restore parameters and/or values circuit, routine or application 112, which prompts the user through, for example, a user interface, which ones of the current parameters and/or values 124 the user is to access.

Once the user indicates the set of one or more of the current parameters and/or values 124 that are to be accessed, the restore parameters and/or values circuit, routine or application 112 requests, for example, the memory controller 130 to allocate memory space to store a duplicate set 126 of at least the indicated set of one or more of the current parameters and/or values 124. It should be appreciated that the indicated set of one or more of the current parameters or values 124 may be only a portion of, or may be all of, the current parameters and/or values 124. Once the memory controller 130 has allocated the requested memory space in the memory 120, the restore parameters and/or values circuit, routine or application 112 controls the memory controller 130 to store the duplicate set of at least the indicated current set of one or more of the parameters and/or values 112 in the memory space allocated to the duplicate set of parameters and/or values 126. The memory space may be allocated in the memory 120 or in some other memory device of the data processing system 100. The restore parameters and/or values circuit, routine or application 126 retains the one or more addresses of the one or more memory locations allocated to the duplicate set of parameters and/or values 126.

The user then accesses the currently-stored parameters and/or values 124 and may modify one or more of the currently-stored parameters and/or values 124 for various reasons. If the user should erroneously change one or more of the current parameters and/or values 124, the user may require the values of at least some of the current parameters and/or values 124 to be placed back to their previous parameters and/or values. In various exemplary embodiments, the user at least causes the restore parameters and/or values circuit, routine or application 112 to restore at least the erroneously modified ones of the current parameters and/or values 124 with the corresponding ones of the duplicate parameters and/or values 126.

When activated, the restore parameters and/or values circuit, routine or application 112 "looks up" the corresponding one or more memory locations and retrieves the corresponding one or more of the duplicate parameters and/or values 126 from those memory locations. The restore parameters and/or values circuit, routine or application 112 then replaces the at least the one or more erroneously modified ones of the current parameters and/or values 126 with the corresponding one or more duplicate parameters and/or values 126. As a result, the restore parameters and/or values circuit, routine or application 12 restores these ones of the current parameters and/or values to their previous parameters and/or values. The user may then re-access the restored parameters and/or values 124 or the user may exit the data processing system 100.

Figure 2:
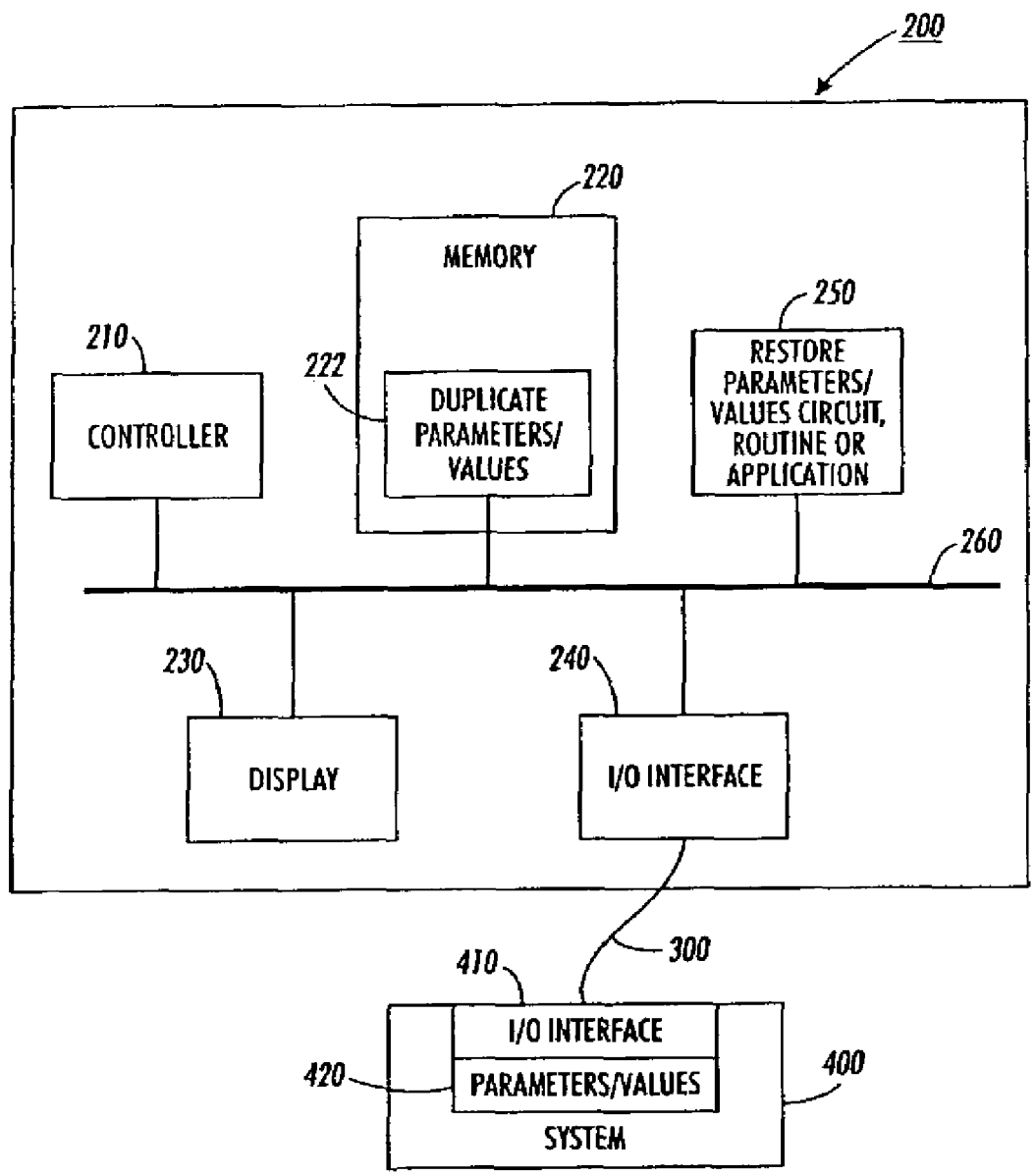
FIG. 2 shows a functional block diagram of a second exemplary embodiment of an apparatus that is capable of restoring a set of one or more current parameters and/or values according to this invention.

FIG. 2 shows a functional block diagram of a second exemplary embodiment of an apparatus 200 that is able to restore current parameters and/or values according to this invention. As shown in FIG. 2, the apparatus 200 includes a logic unit 210, a memory 220, a display 230, an input/output (I/O) interface 240, and a restore parameters and/or values circuit, routine or application 250, interconnected by one or more control and/or data busses and/or application programming interfaces 260. The apparatus 200 generally corresponds to any known or later-developed device that the systems, apparati and methods according to this invention are usable with. The apparatus 200 may correspond, for example, to test equipment, stationary or portable computers, personal digital assistants (PDAs), cellular phones and the like. In various exemplary embodiments, the I/O interface 240 of the apparatus 200 may be coupled to an I/O interface 410 of a remote system 400 through a link 300 which provides a communication channel between the apparatus 200 and the remote system 400.

In various exemplary embodiments, the restore parameters and/or values circuit, routine or application 250 accesses a set of one or more of the current parameters and/or values 420 stored in the remote system 400 to create a duplicate set of those one or more parameters and/or values 222, and stores that duplicate set 222 to one or more memory locations of the memory 220 of the apparatus 200. In various exemplary embodiments, before the user accesses one or more current parameters and/or values 420 stored in the remote system 400, the user executes the restore parameters and/or values circuit, routine or application 250. In response, the restore parameters and/or values circuit, routine or application 250 prompts the user, for example, through a user interface displayed using the display 230, to identify or select a particular set of one or more stored parameters and/or values stored at the remote system 400 the user wishes to access.

Once the user indicates the particular set of one or more parameters and/or values 420 to be accessed, the restore parameters and/or values circuit, routine or application 250 causes the apparatus 200 to communicate with the remote system 400 to move a copy of the specified set of the stored one or more parameters and/or values 420 to the apparatus 200. On receiving the specified set, which forms the duplicate set of one or more parameters and/or values 222, the restore parameters and/or values circuit, routine or application 250 stores the duplicate set of one or more parameters and/or values 222 in the memory 220. The user may then proceed to modify various ones of the parameters and/or values 420 of the system 400 to perform, for example, diagnostics or optimization. For example, the user may use the apparatus 200 to issue commands to the remote system 400 that modify the one or more current parameters and/or values 420.

Should the user err while altering one or more of the parameters and/or values 420 of the remote system 400, at least some of the parameters and/or values 420 may have to be reconfigured or reset to place the remote system 400 back into a known configuration. Accordingly, the user may execute the restore parameters and/or values circuit, routine or application 250 of the apparatus 200. The restore parameters and/or values circuit, routine or application 250 then retrieves the stored duplicate set of one or more of the parameters and/or values 222 from the memory 220 and instructs the remote system 400 to replace at least some of the modified current parameters and/or values 420 accessed by the user with one or more of the duplicate one or more of parameters and/or values 222. Once the at least some of the accessed set of the stored parameters and/or values 420 have been replaced with the corresponding ones of the duplicate parameters and/or values 222, the user may re-access those replaced parameters and/or values or the personnel may terminate the operation.

Figure 3:
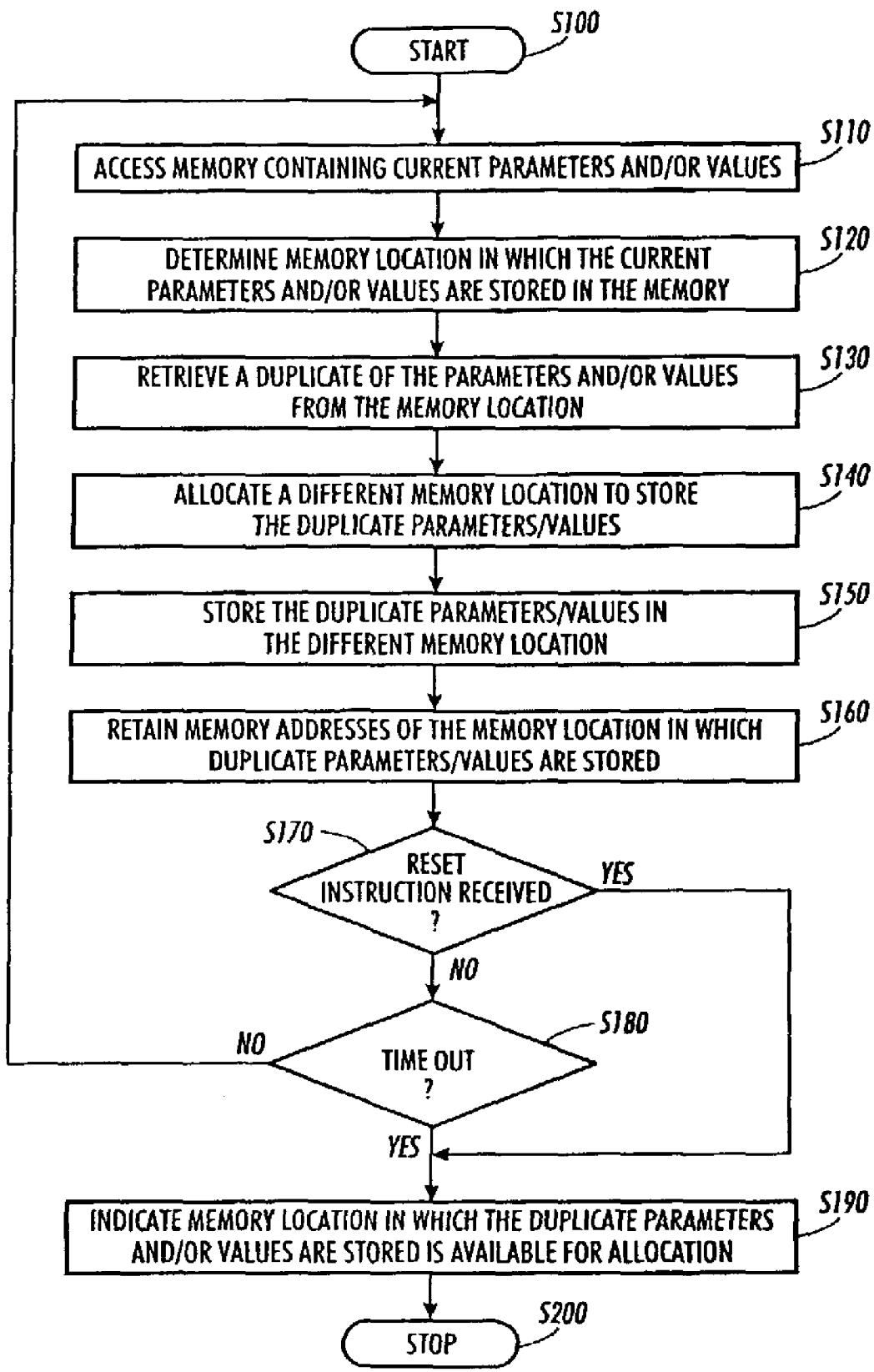
FIG. 3 is a flowchart outlining one exemplary embodiment of a method for storing one or more duplicate parameters and/or values according to this invention.

FIG. 3 is a flowchart outlining one exemplary embodiment of a method for storing duplicate parameters and/or values according to this invention. As shown in FIG. 3, operation begins in step S100, and continues to step S110, where a memory containing the current parameters and/or values is accessed. Next, in step S120, one or more memory locations of the current parameters and/or values are determined. The memory location or locations of all the parameters and/or values may be determined. Alternatively, the memory location or locations for only a portion of the parameters and/or values to be accessed may be determined. Then, in step S130, a duplicate set of one or more of the parameters and/or values from the determined memory location or locations is created. Operation then continues to step S140.

In step S140, one or more memory locations are allocated to contain the duplicate set of the one or more of the parameters and/or values. In one exemplary embodiment, the memory location may be in the same physical memory. In various other exemplary embodiments, the memory location may be in a different physical memory. Next, in step S150, the duplicate set of the one or more parameters and/or values are stored in the allocated one or more memory locations. Then, in step S160, one or more memory addresses of the one or more memory locations in which the duplicate set of the one or more parameters and/or values are stored are retained. Operation then continues to step S170.

In step S170, a determination is made whether a parameter and/or value altering the operation has been terminated. If so, operation jumps directly to step S190. Otherwise, the operation continues to step S180, where a determination is made whether a predetermined amount of time had passed since the duplicate set of the one or more parameters and/or values were stored in the one or more memory locations. If the predetermined amount of time had passed, operation continues to step S190. Otherwise, operation returns to step S110 to repeat the operation. In step S190, the one or more memory locations for the duplicate set of the one or more parameters and/or values are relinquished and that memory space is reallocated. Operation then continues to step S200, where operation of the method terminates.

In various exemplary embodiments, step S170 may be omitted, and no reset takes place. In various exemplary embodiments, the step S180 may be omitted, and no time out takes place. In various exemplary embodiments, the current and the duplicate parameters and/or values may be in the same memory, such as memory 120, as shown in FIG. 1. In alternative embodiments, the current and the duplicate parameters and/or values may be in different memories, such as the memory in the system 400 and the memory 220 of apparatus 200, respectively, as shown in FIG. 2.

Figure 4:
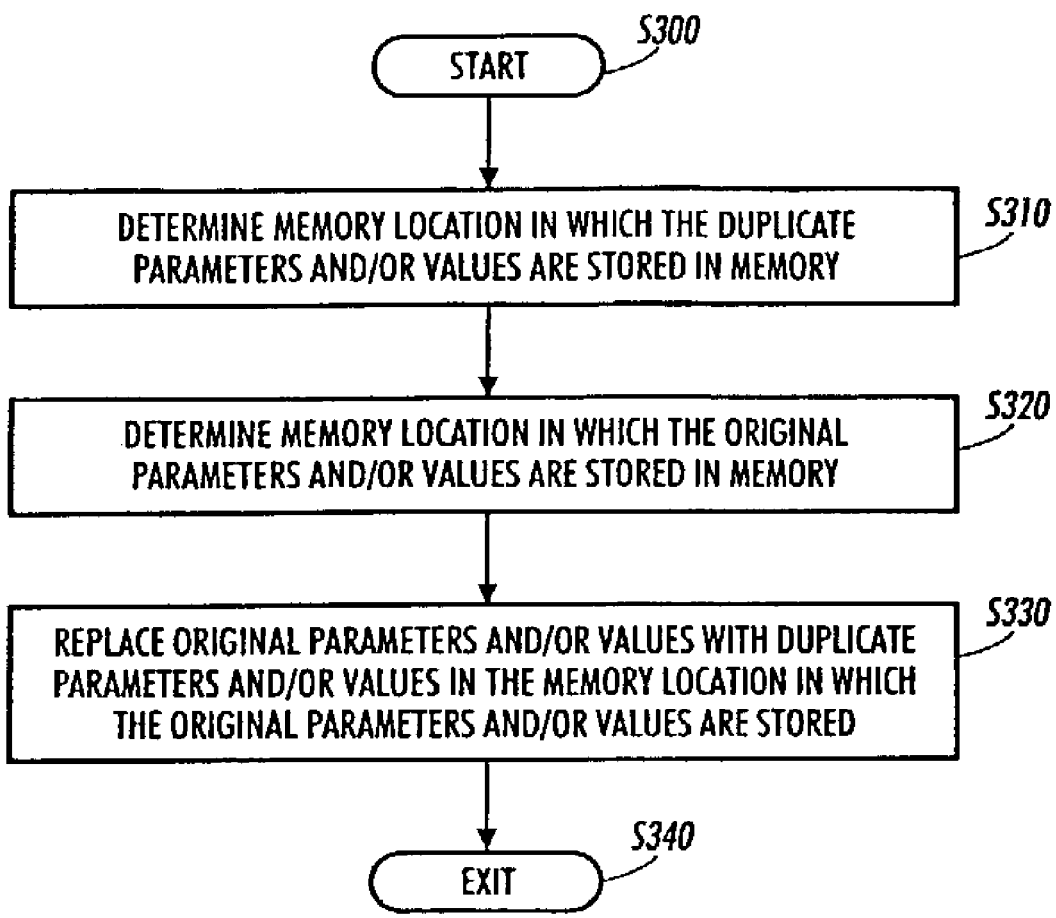
FIG. 4 is a flowchart outlining one exemplary embodiment of a method for restoring one or more altered parameters and/or values with one or more stored earlier parameters and/or values according to this invention.

FIG. 4 is a flowchart outlining one exemplary embodiment of a method for replacing one or more current parameters and/or values with one or more corresponding duplicate parameters and/or values according to this invention. Operation of the method begins in step S300, and continues to step S310, where one or more memory locations of a memory in which the one or more duplicate parameters and/or values are stored are determined. Then, in step S320, one or more memory locations of the current parameters and/or values to be replaced are determined. Next, in step S330, the one or more current parameters and/or values are replaced with the one or more corresponding duplicate parameters and/or values. Operation then continues to step S340, where operation of the method terminates.

As shown in FIGS. 1 and 2, the memory can be implemented using any appropriate combination of alterable volatile or nonvolatile memory. The alterable memory, whether volatile or nonvolatile, can be implemented using any one or more of static or dynamic RAM. The alterable memory can also be a floppy disk and disk drive, a writeable or rewriteable optical disk and disk drive, a hard drive, a flash memory or the like.

As shown in FIG. 2, the link 410 can be any known or later-developed device or system for connecting the remote system 400 to the apparatus 200, including a wired connection, a wireless connection, a connection over a wide area network, a local area network or a storage area network, a connection over an intranet, a connection over an extranet, a connection over the Internet, or a connection over any other distributed processing network or system. In general, the link can be any known or later-developed connection system or structure usable to connect the apparatus 200 to the remote system 400.

As shown in FIGS. 1 and 2, the system 100 and the apparatus 200 are, in various exemplary embodiments, implemented using a programmed general purpose computer. However, the system 100 and the apparatus 200 can also be implemented using a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 3 and/or 4, can be used.

While the invention has been described in conjunction with specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. An apparatus, comprising:
   a memory to store one or more operating parameters and/or values for at least one data processing system in a first memory location, the operating parameters and/or values being pertinent to operation of the data processing system;
   a circuit, routine or application that is activated when a user desires access to one or more parameters and/or values from the first memory location to alter the parameters and/or values;
   the circuit, routine or application upon activation receives selection of parameters and/or values to be accessed and allocates memory space sufficient to store a duplicate copy of the one or more selected parameters and/or values and stores the duplicate of the one or more parameters and/or values to be accessed in at least one second memory location that is distinct from the first memory location prior to allowing access by the user to the one or more operating parameters and/or values; and
   the circuit, routine or application replaces one or more parameters and/or values in the first memory location with the one or more parameters and/values stored in the second memory location in the event of an indication of erroneous alterations to one or more operating parameters and/or values in the first memory by the user.

2. The apparatus of claim 1, wherein the selection of operating parameters and/or values to be accessed include selection of individual operating parameters and/or values.

3. The apparatus of claim 1, wherein the memory containing one or more parameters and/or values in the first memory location is physically separate from the memory containing the duplicate one or more parameters and/or values in the second memory location.

4. The apparatus of claim 1, wherein the first memory location is at least one memory location.

5. The apparatus of claim 1, wherein the second memory location is at least two physically separate memory locations.

6. The apparatus of claim 1, wherein the apparatus is an image processing device.

7. The apparatus of claim 1, wherein only the selected operating parameters and/or values to be altered upon access are stored in the second memory.

8. A method for managing a state of parameters or values used by a data processing device, comprising:
   receiving user selection of one or more operating parameters and/or values to be accessed by a user to be altered, the one or more parameters and/or values being stored in a first memory location and being pertinent to operation of the data processing device;
   upon selection of the one or more operating parameters and/or values by the user, allocating memory space sufficient to store a complete duplicate copy of the selected one or more operating parameters and/or values;

creating a duplicate of the selected one or more operating parameters and/or values to be accessed;

storing the duplicate of the one or more operating parameters and/or values in a second memory location upon selection of the one or more operating parameters and/or values by the user, but prior to access of the one or more operating parameters and/or values by the user;

allowing the user to manually access and modify one or more of the operating parameters and/or values in the first memory location only after the storing of the duplicate; and restoring one or more parameters and/or values in the first memory location with one or more parameters and/values stored in the second memory location in the event of an indication of erroneous alterations to one or more operating parameters and/or values in the first memory by the user.

9. The method of claim 8, wherein only the selected operating parameters and/or values to be altered upon access are stored in the second memory.

10. The method of claim 8, further comprising retaining one or more memory addresses of the second memory location containing the duplicate of one or more parameters and/or values.

11. The method of claim 8, further comprising relinquishing the second memory location containing the duplicate of one or more parameters and/or values if a signal indicating the second memory location is to be relinquished is received.

12. The method of claim 8, further comprising relinquishing the second memory location containing the duplicate of one or more parameters and/or values if a predetermined amount of time has passed since the duplicate parameters and/or values was stored in the second memory location.

13. The method of claim 8, wherein the selection of operating parameters and/or values to be accessed include selection of individual operating parameters and/or values.

* * * * *